United States Patent
Yoshiyagawa et al.

[11] 3,843,228
[45] Oct. 22, 1974

[54] PRODUCTION OF LIGHT-CONDUCTING GLASS STRUCTURES WITH REFRACTIVE INDEX DISTRIBUTION

[75] Inventors: Mitsugi Yoshiyagawa, Takarazuka; Tomio Sugioka, Itami; Yoshiro Ikeda, Nishinomiya, all of Japan

[73] Assignee: Nippon Selfox Kabushiki Kaisha (also known as Nippon Selfoc Co., Ltd.), Tokyo-to, Japan

[22] Filed: Aug. 2, 1972

[21] Appl. No.: 277,292

Related U.S. Application Data

[63] Continuation-in-part of Ser. No. 861,905, Sept. 29, 1969, abandoned.

[30] Foreign Application Priority Data
Oct. 3, 1968 Japan.............................. 43-72096
Dec. 6, 1968 Japan.............................. 43-89786

[52] U.S. Cl................ 350/96 R, 65/30, 65/DIG. 7, 65/111, 350/96 WG, 350/175 GN, 106/47 Q, 106/50, 106/53, 106/52, 65/3
[51] Int. Cl. ...... G02b 5/14, C03c 15/00, C03c 3/00
[58] Field of Search .......... 65/30, 111, 3; 106/47 Q, 106/50, 53, 52, 54; 350/96, 96 B, 96 WG, 175 GN, 96 R

[56] References Cited
UNITED STATES PATENTS

| | | | |
|---|---|---|---|
| 2,455,719 | 12/1948 | Weyl et al. | 65/30 |
| 2,701,215 | 2/1955 | Kroeck | 65/32 X |
| 3,281,225 | 10/1966 | Hazdra et al. | 65/30 |
| 3,320,114 | 5/1967 | Schulz | 65/30 |
| 3,486,808 | 12/1969 | Hamblen | 65/30 X |
| 3,647,406 | 3/1972 | Fisher | 65/30 |
| 3,650,598 | 3/1972 | Kithno et al. | 65/3 |

*Primary Examiner*—Frank W. Miga
*Attorney, Agent, or Firm*—Robert E. Burns; Emmanuel J. Lobato; Bruce L. Adams

[57] ABSTRACT

A contact surface of a glass body, along an axis of which light is to advance, containing at least one modifying oxide is caused to contact an agent having an affinity for the oxide sufficient to extract at least cations of the oxide from the glass body through the contact surface, whereby the concentration of the cations and thus the refractive index within the glass body are caused to increase continuously from the contact surface toward the axis of the glass body, through which light can be conducted along the axis in an undulating path without it being reflected at the outer surface of the glass body.

23 Claims, 18 Drawing Figures

PRODUCTION OF LIGHT-CONDUCTING GLASS STRUCTURES WITH REFRACTIVE INDEX DISTRIBUTION

CROSS REFERENCE TO THE RELATED APPLICATIONS

This is a continuation-in-part application of our application Ser. No. 861,905 filed Sept. 29, 1969, now abandoned.

BACKGROUND OF THE INVENTION

This invention relates generally to materials and structures capable of conducting light and optical images and more particularly to a new method of producing light-conducting structures each having a refractive index gradient in directions transverse to the direction in which light is to advance through the structure.

Recently, there has been active research relating to light communication in which laser light is used. For light-conducting path means of this light communication, various proposals have been made. One of these proposals is that disclosed by Teiji Uchida (in a preprint compilation "Laser Application," issued October, 1967, for the Fiftieth Anniversary National Convention Symposium of the Denshi-Tsushin Gakkai (Japan Electronic Communication Society) ), in which the utilization of a glass structure having a refractive index which decreases in proportion to the square of the distance from the centerline for a light-conducting path means or a portion thereof is described.

This glass light-conducting path means is advantageous in that it is not easily affected by the atmosphere and other like environmental conditions and in that it is formable into bent shapes or flexible depending on the necessity. However, a method of producing glass light-conducting path means or fibers having a refractive index distribution of the above described character has heretofore been unknown, and, consequently, it has not been possible to reduce such a path or conducting means to practice.

Furthermore, so-called gas lenses are known, one example being described in "The Bell System Technical Journal," March, 1965, in which it is disclosed that a body of gas or some other transparent body having a refractive index distribution wherein the index decreases or increases in proportion to the square of the distance from the centerline of the body has a lens effect. It has not been possible, however, to produce a practical body which is a transparent lens having a refractive index distribution of this nature.

SUMMARY OF THE INVENTION

It is an object of the present invention to provide a glass light-conducting path means for light communication which could not be practically realized heretofore and a light-conducting glass structure, such as a glass lens structure, having a refractive index gradient.

More specifically, an object of the invention is to provide a light-conducting glass structure, along an axis of which light advances when the structure is in the form of fiber, in which, by causing the glass interior to possess a positional or radial distribution of the concentration of at least one modifying oxide which is a constituent of the glass or cations thereof in which the concentration varies progressively with position in the radial direction, a refractive index gradient is established in the direction of the concentration variation which is transverse to the axis.

Another object of the invention is to provide a method of producing light-conducting glass structures of the above described character.

According to the present invention in one aspect thereof, briefly summarized, there is provided a method of producing light-conducting glass structures, along an axis of which light advances, in which a glass body containing at least one kind of modifying oxide is caused to contact an agent having an affinity for the oxide sufficient to extract at least cations of the oxide from the glass body. Thus, these cations are extracted through the contact surface of the glass body, and the distributions of ion concentration and thus of refractive index within the glass body as described above are obtained.

The nature, principle, and utility of the invention will be more clearly apparent from the following detailed description, beginning with general considerations and concluding with specific examples of practice constituting preferred embodiments of the invention, when read in conjunction with the accompanying drawings.

DETAILED DESCRIPTION

In a light-conducting glass structure in which the refractive index is caused to very continuously in directions transverse to the direction in which light is to advance thereby to cause the light advance path to be curved within the structure, utilization is made of the principle whereby, when an incident light is directed into a glass having positional or radial distribution wherein the refractively index varies progressively in directions transverse to the axis, the light advances as its advance direction is gradually curved in the direction in which the refractive index increases in the refractive index gradient transverse to the general light advance direction.

When the refractive index of this light-conducting glass structure at the central axis or the centerline region (in the case of a structure of cylindrical or fiber form) or at the center plane (in the case of a structure of ribbon or plate form) in the intended direction of advance of the light is maintained at the maximum value, and a refractive index gradient at other parts wherein the index decreases with increasing distance from the centerline or center plane, an incident light directed with an incidence angle within a specific range into this glass structure advances with undulating motion about the centerline or center plane as a center.

Figure 1:
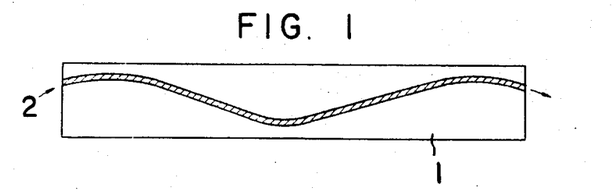
FIG. 1 is an enlarged diagrammatic side view, in longitudinal section, indicating the manner in which light advances through the interior of a light-conducting glass structure of fiber form having a refractive index gradient in the radial direction.

As indicated diagrammatically in FIG. 1, when an incident light beam 2 is introduced into one end of a light-conducting glass structure 1 of fiber form having a refractive index distribution wherein the index continuously decreases with increasing distance from the centerline, the light beam 2 advances through the structure without being reflected at the fiber outer surface. Therefore, phase velocity lag and spreading of the light beam at the light exit end of the fiber are substantially lower than those in an optical fiber in which conventional reflection action is utilized.

Furthermore, the most preferably refractive index distribution within the fiber is one which is substantially representable by the equation $N = N_o(1 - Cr^2)$, where $r$ is distance radially from the central part of the fiber, $N_o$ is the refractive index of the glass at the central part, $N$ is the refractive index at a position at distance $r$, and $C$ is a positive constant which is usually from $2 \times 10^{-4} mm^{-2}$ to $2 \times 10^2 mm^{-2}$, especially from $1 \times 10^{-3} mm^{-2}$ to $1 \times 10^2 mm^{-2}$ when the distance $r$ is expressed in terms of mm. (millimeter).

When a light beam of a constant width is introduced, as it is caused to undergo mode matching, into one end of a fiber having the above specified refractive index distribution, this light leaves the other or exit end of the fiber with the width thereof maintained constant and without phase velocity lag even when the fiber is deflected or curved with a radius of curvature which is greater than a certain limiting radius of curvature.

Figure 2:
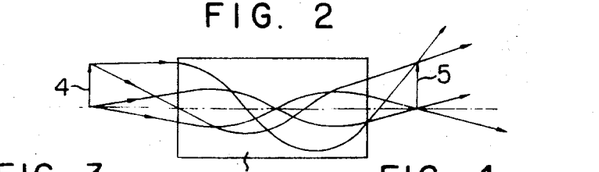
FIG. 2 is a similar view indicating light ray conduction within a glass fiber produced in accordance with the invention whereby an image of an object can be conducted and reformed as a real image.

In an optical fiber 3 produced in accordance with the invention as shown in FIG. 2, the refractive index distribution in a cross section perpendicular to the direction of light advance therethrough substantially satisfies the aforementioned equation $N = N_o (1 - Cr^2)$. When an optical object 4 is placed in front of one end of the optical fiber 3, light rays from the object advance through the fiber in each case with a path of sinusoidal wave form wherein the characteristic wavelength $S$ is $2\pi/\sqrt{2a}$, and, as a result, a real image 5 is formed outside of the fiber 3 at the other end thereof.

While the real image 5 is formed outside of the fiber 3 in the example described above and illustrated in FIG. 2, it is also possible to form the real image in the plane of the light exit at the exit end of the optical fiber 3 by suitably selecting the length of the optical fiber 3 and the distance between this fiber and the object 4, and, furthermore, the magnification or reduction can be adjusted.

A fiber having a refractive index distribution of this nature can be advantageously used as a conducting means or path for laser communication. Fibers or rod-shaped structures of this character, when cut into a specific length, can be used as a single lens, a combination of a plurality of lenses, or an optical image conducting structure, as disclosed in copending Japanese Patent Application No. 60098/1968 filed on Aug. 21, 1968.

As mentioned briefly hereinbefore, the present invention contemplates the provision of a technique whereby the concentration within a glass of at least one modifying oxide which is a constituent of the glass or cations thereof is caused to vary with position in the directions transverse to the direction in which light is to advance within the glass thereby to establish a refractive index gradient within the glass in the direction of variation of the concentration. The term "glass-forming oxide" means an oxide which can form glass, such as $SiO_2$ and $B_2O_3$; the term "modifying oxide" means, in a narrow sense, an oxide which by itself cannot form glass but can form glass when it is molten in admixture in a certain proportion with a glass-forming oxide, such as $Na_2O$, $K_2O$, $Tl_2O$, $CaO$, and $BaO$; and the term "intermediate oxide" means an oxide which possesses characteristics intermediate between those of a glass-forming oxide and a modifying oxide, such as $BeO$, $Al_2O_3$, and $ZnO$. It should be noted that the term "modifying oxide" is herein used in a broad sense, and the term is thus intended to include an intermediate oxide.

The effect of a modifying oxide which is a constituent of a glass on the glass refractive index is, in general, such that the refractive index decreases when the proportion of the modifying oxide decreases as long as the glass-forming oxide and another modifying oxide increase proportionally to the decrease in the proportion of the modifying oxide.

The present invention provides a method wherein a certain modifying oxide or cations thereof in a glass are extracted locally from certain parts thereof to vary with position the concentration of the remainder of the modifying oxide or cations thereof in the glass and thereby to produce a light-conducting glass structure having a positional distribution of refractive index which decreases in the direction of decrease in the above mentioned concentration.

More specifically, the present invention provides a method of producing light-conducting glass structures in which, by causing a glass containing a certain modifying oxide to contact an agent having an affinity with respect to the oxide of sufficiently high order to extract the oxide or cations thereof from the glass, the oxide or cations thereof are extracted through the contact surface, and the concentration of the remaining oxide or cations thereof is caused to increase progressively from the contact surface toward the interior of the glass. Thus, the refractive index is increased progressively or continuously from the outer surface toward the interior of the glass, and in this manner the refractive index is caused to vary progressively or continuously in directions transverse to the direction in which light is to advance, whereby the light advance path is curved within the glass.

Examples of the above mentioned agents suitable for use in accordance with the invention are:

1. surfur dioxide, sulfur trioxide, chlorine, chlorine monoxide, chlorine dioxide, phosgene, phosphorus pentoxide, bromine, iodine, hydrogen bromide, phosphorus trichloride, and other acidic gases;
2. thionyl chloride, sulfuryl chloride, thionyl bromide, and other acid halides or acyl halides;
3. zirconium oxide, chromium oxide, and other metal oxides;
4. carbon tetrachloride, anhydrous silicon tetrachloride, and like compound;
5. hydrochloric acid, boric acid, nitric acid, oxalic acid, acetic acid, phosphoric acid, phosphorous acid, aluminum chloride, ammonium sulfate, ammonium chloride, and calcium chloride, in vapor form;
6. clay-like minerals such as zeolite, montmorilonite, illite, kaolinite, and metakaolin;
7. water vapor;
8. water; and
mixtures of two or more of these agents.

These agents are caused to contact the glass in the form of solids, liquids, or gases. When an agent in liquid form or vapor form is to be caused to contact the glass, it is preferable to carry out this contact process in a sealed vessel or under a high pressure so as to prevent evaporation of the liquid or to increase the reaction velocity of the agent in vapor.

While the refractive index of the glass is reduced when a modifying oxide is extracted in a quantity of a number of mole percent from the glass, the magnitude of this reduction differs with the modifying oxide, particularly with the kind of cations constituting the oxide. In general, there appears to be a tendency for cations with higher values of the ratio (electron polarizability) / (ion radius)$^3$ to contribute more to increase in the refractive index. That is, the order of this contribution is Tl>Li>K ≈ Na ≈ Rb in the case of monovalent cations. In the case of divalent cations, the order beginning with cations of high degree of contribution to increase in the refractive index is Pb>Ba>Cd>Sr>Ca>Zn>Be>Mg.

For the cations, ions having a relatively high rate of diffusion in the glass and ions of high elution speeds are desirable. For this reason, suitable modifying oxides to be extracted are oxides of thallium and alkali metals as those containing monovalent cations, particularly thallium oxide, and oxides of lead as those containing divalent cations.

Simultaneously with the extraction or instead of the extraction of the modifying oxide from the glass, cations constituting the modifying oxide diffuse and migrate toward the outer surface to be extracted, and hydrogen ions contained in the aforementioned agent or hydrogen ions within the water film adsorbed on the glass surface diffuse and migrate within the glass in some cases. A state of partial substitution of the above mentioned cations and hydrogen ions is then attained within the glass.

If it is assumed that the migration and extraction of non-bridging oxygen ions constituting the modifying oxide are of negligibly small order, it may be considered that the refractive index distribution is produced by the substitution of these cations by hydrogen ions. Since the cations have a higher ratio of (electron polarizability) / (ion radius)$^3$ and higher degree of contribution to increase in the glass refractive index than the hydrogen ions, the resulting refractive index distribution becomes such that the refractive index increases with increase in the concentration of the above mentioned cations, that is, with distance inward from the glass outer surface.

Accordingly, if either the extraction of the modifying oxide or substitution of the cations constituting the modifying oxide by the hydrogen ions or both occur(s) through the glass contact surface, a glass having a refractive index gradient wherein the index increases continuously from the glass contact surface toward the interior can be obtained.

For the above mentioned modifying oxide to be extracted or cations thereof, monovalent cations or oxides thereof as mentioned before, particularly thallium and alkali metal ions or oxides thereof, are suitable. Of these cations and oxides, Tl$^+$ and Tl$_2$O are more particularly suitable since they facilitate the establishing of relatively high refractive index gradients.

While constituents such as SO$_3$ other than hydrogen ions contained in the agent dissolve or diffuse in the glass in some cases, their effect on the refractive index is ordinarily of negligible order.

When an acidic gas such as sulfur dioxide gas or chlorine, an acid halide such as thionyl chloride or sulfuryl chloride, or an acid vapor is used as the agent, and when moreover, the contact temperature is relatively low (e.g., of a value below the annealing temperature region of the glass), the process of forming the reaction products on the surface of the glass contacted by the agent can be considered to be representable principally by the following chemical equation if it is assumed, for example, that SO$_3$ is caused to contact a glass fiber consisting of 44% by weight of Tl$_2$O, a modifying oxide, and 56% by weight of SiO$_2$, a glass forming oxide, in which the concentrations of Tl$_2$O and SiO$_2$ and the refractive index of the glass are uniform in the radial direction.

$$2.\text{Tl}^+ \text{ (glass)}^- + SO_3 + H_2O = 2.H^+ \text{ (glass)}^- + Tl_2SO_4$$

Figure 8:
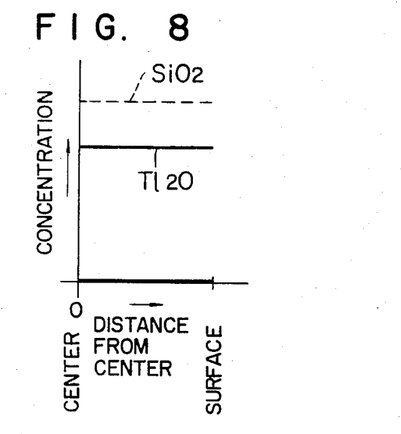
FIGS. 8 and 10 are graphical representations indicating distributions of $SiO_2$, $Tl_2O$ and $H_2O$ within a glass body before being treated (FIG. 8) and after being treated in accordance with the invention (FIGS. 9 and 10)
Figure 9:
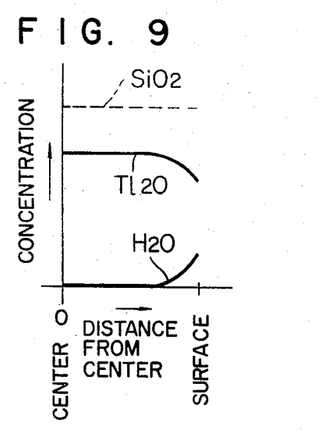

Thus, it may be considered that water film adsorbed on the glass surface or water in the atmosphere participates in the reaction. Among the Tl$^+$ ions within the glass, those near the outer surface of the glass are caused, due to the action of SO$_3$, to migrate toward the surface to be extracted out of the glass whereby a film of Tl$_2$SO$_4$ is formed on the outer surface. At the same time, H$^+$ ions which have been adsorbed on the outer surface enter the interior of the glass to exchange the Tl$^+$ ions thereby to maintain the interior of the glass electrically neutral. As a result, the concentration of Tl$^+$ ions or Tl$_2$O near the surface becomes lower than that of Tl$^+$ ions at a place distant from the surface which is the same as or lower in some extent than the initial Tl$^+$ ion concentration which is uniform throughout the glass body as shown in FIG. 8. The concentration within the glass of H$^+$ ion or H$_2$O is relatively high near the surface and is relatively low at a place distant from the surface, the H$^+$ ion concentration at the place distant from the surface being the same as the initial $H^+$ ion concentration, viz. zero, or larger than that as shown in FIG. 9.

After the glass has been contacted by the agent, and the $Tl_2SO_4$ film on the glass surface has been removed, the glass is maintained for a certain time at a temperature exceeding the annealing temperature thereof. A portion of $H^+$ ions in the vicinity of the glass surface and non-cross link oxygen ions thereupon evaporate and are removed as $H_2O$, and, at the same time, mutual diffusion of $Tl^+$ ions and $H^+$ ions also occurs in the interior of the glass.

When some of $H^+$ ions and non-bridging oxygen ions within the glass near the surface are evaporated off as $H_2O$, the concentration of $SiO_2$ relatively increases. Further, within the glass body, ion exchange of $Tl^+$ ions by $H^+$ ions or mutual diffusion of $Tl^+$ ions and $H^+$ ions takes place so that $Tl^+$ ions at a place distant from the surface migrate toward the surface where $Tl^+$ ion concentration is lower and $H^+$ ions near the surface migrate toward the interior of the glass where $H^+$ ions concentration is lower. At the same time, $Tl^+$ ions and non-bridging oxygen ions or, in other words, $Tl_2O$, at a place distant from the surface migrate toward the surface where $Tl_2O$ concentration is lower. Thus, the concentration gradient of $Tl^+$ ions or $Tl_2O$ within the glass body becomes lower in some extent by the treatment at a temperature exceeding the annealing temperature of the glass body.

Figure 10:
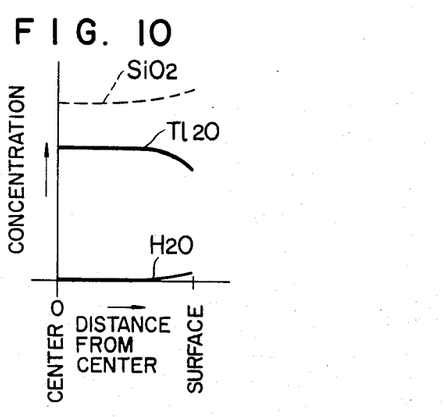

As a result, concentration distribution of $Tl_2O$, $SiO_2$, and $H_2O$ are modified to be shown in FIG. 10. Thus, the concentration of $Tl_2O$ nearer the surface decreases more greatly from the initial $Tl_2O$ concentration so that the concentration of $Tl_2O$ continuously increases from the surface toward the center, where it is the same as or slightly lower than the initial $Tl_2O$ concentration of $SiO_2$ nearer the surface increases more greatly from the initial $SiO_2$ concentration so that the concentration of $SiO_2$ continuously decreases from the surface toward the center, where it is the same as or slightly higher than the initial $SiO_2$ concentration. The concentration of $H^+$ ions or of $H_2O$ nearer the surface is higher so that it continuously decreases from the surface to the center where it is substantially zero. When the maintenance time at the temperature exceeding the annealing temperature is relatively long, the evaporation of $H_2O$ takes place to a considerable extent whereby little $H_2O$ can finally remain in the glass body.

Figure 11:
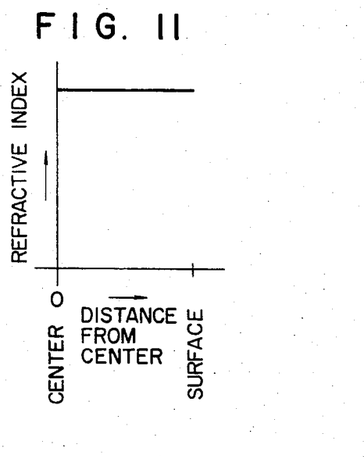
FIGS. 11 and 12 are graphical representations of the internal refractive index distribution of a glass body respectively before and after being treated in accordance with the invention.
Figure 12:
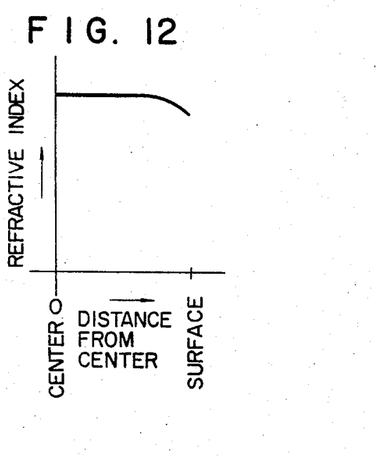

When a glass comprising $Tl_2O$ and $SiO_2$ has $Tl_2O$ concentration decreased by extraction of some of $Tl_2O$ and, accordingly, has $SiO_2$ concentration increased it has lower refractive index than the original glass before the extraction. Further, when a glass containing $Tl^+$ ions has a part or all of the $Tl^+$ ions replaced with $H^+$ ions, the glass has lower refractive index than the original glass before the replacement. Thus, the refractive index distribution within the glass comprising $Tl_2O$ and $SiO_2$, which has been uniform throughout the glass body as shown in FIG. 11, is, after the treatment, such that the refractive index continuously increases from the outer surface toward the center or, in other words, it continuously decreases from the center toward the outer surface, the refractive index at the center being substantially the same as or smaller than the original one as shown in FIG. 12.

Figure 13:
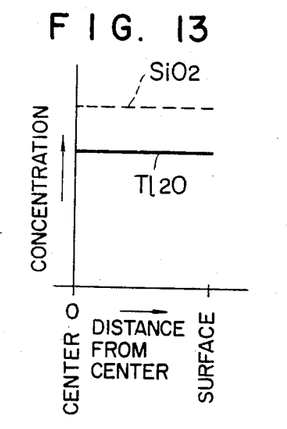
FIGS. 13 and 14 are graphical representations indicating distributions of $SiO_2$ and $Tl_2O$ within a glass body respectively before and after being treated in accordance with the invention.
Figure 15:
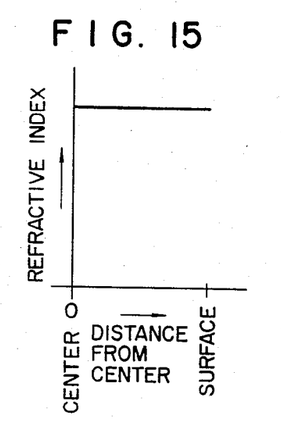
FIGS. 15 and 16 are graphical representations of the internal refractive index distribution of a glass body having a concentration distribution as indicated in FIGS. 13 and 14, respectively.

On the other hand, in the case where the contact temperature is relatively high, for example, where it exceeds the annealing temperature of the glass, and $SO_3$ is to be caused to contact a glass fiber consisting of 44% by weight of $Tl_2O$, a modifying oxide, and 56% by weight of $SiO_2$, a glass forming oxide, in which the concentrations of $Tl_2O$ and $SiO_2$ and the refractive index of the glass are uniform in the radial direction as shown by FIGS. 13 and 15, respectively, a reaction process as indicated by the following equation may be considered to predominate at the glass outer surface.

$$Tl_2O + SO_3 = TlSO_4$$

That is, a process wherein $Tl^+$ ions and non-bridging oxygen ions, or $Tl_2O$, in the glass interior diffuse toward the outer surface thereof, and both ions are removed in the form of $Tl_2SO_4$ from the glass outer surface becomes predominant.

Figure 14:
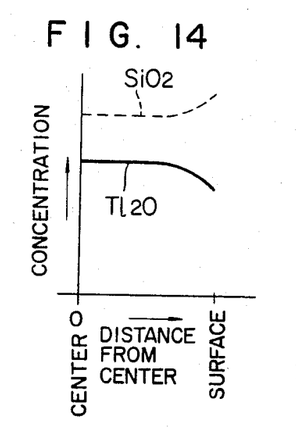
Figure 16:
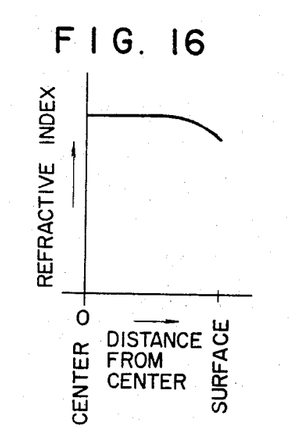

As a result of the contact, the concentration of $Tl_2O$ within the glass nearer the surface is reduced more greatly and the concentration of $SiO_2$ within the glass nearer the surface thus increases more greatly both from the initial concentrations. The concentration of $Tl_2O$ is such that it continuously increases from the surface toward the interior of the glass fiber and, on the contrary, the concentration of $SiO_2$ is such that it continuously decreases from the surface toward the interior of the glass fiber as shown in FIG. 14. Thus, the glass fiber, the initial refractive index distribution of which is uniform as shown in FIG. 15, has such refractive index distribution that the refractive index continuously increases from the surface toward the interior as shown in FIG. 16 or that the refractive index continuously decreases from the center toward the surface. In such a refractive index distribution, the refractive index of glass nearer the surface has been reduced more greatly from the initial one.

In the case where a clay-like mineral such as montmorilonite or metakaolin in the form of fine powder is used as the agent, the reaction between this mineral and the glass may be considered to be substantially the same as that described above. More specifically, it may be considered that the $H^+$ ions contained in the clay-like mineral undergo substitution of the cations, for example, $Na^+$ ions, constituting a modifying oxide within the glass during contact at relatively low temperatures, while this substitution and dehydration occur simultaneously during contact at a relatively high temperature.

The product of reaction at the glass outer surface comprises one or more compounds of the $Na_2O$-$Al_2O_3$-$SiO_2$ system. A fine powder of the clay-like mineral which has been purified and, moreover, has a particle size of the order of a few microns or less is desirable since it is capable of intimately contacting the glass as a slurry.

In the case where zirconium oxide or chromium oxide is used as the agent, products such as sodium zirconate are formed on the glass surface when $Na_2O$ within the glass is extracted. Zirconium oxide is especially desirable since the coating layer formed after treatment through its use can be easily removed.

As mentioned before, water or an aqueous solution can be used as the agent. The kinds of aqueous solutions which can be used are acidic, alkaline, and neutral aqueous solutions, the solutes being selectable from the aforementioned substances. We have found that acidic aqueous solutions are particularly suitable because they afford high speed of elution of glass-modifying ions, and because the glass-forming oxides after elution of glass-modifying ions in the surface layer do not readily break down.

Furthermore, the higher the temperature of the process aqueous solution is, below the boiling point, the better will the results be. Gentle agitation of the process aqueous solution increases the speed of elution of the modifying ions. The thickness of the surface layer after elution of the glass-modifying ions of a glass fiber treated by the aqueous solution is preferably of the order of from 20 to 50 percent of the original radius in order to obtain a concentration distribution of a substantially parabolic shape with thermal diffusion and migration of low degree of the glass-modifying ions and to obtain a large difference between the refractive indexes at the surface and at the center.

In accordance with the invention, the glass fiber in which the modifying ions of the surface layer have been eluted by the aqueous solution treatment is maintained at a temperature below the strain point thereof thereby to eliminate the pores produced in the surface layer after elution of the modifying ions, and the resulting glass fiber is then maintained for a long time at a temperature above the strain point and below the softening point thereby to cause thermal diffusion in the interior of the fiber due to difference in concentration of the modifying ions. As a result, a glass fiber having a refractive index distribution of substantially parabolic profile is produced.

Examples of cations capable of constituting modifying oxides (including intermediate oxides) according to the invention are $Li^+$, $Na^+$, $K^+$, $Rb^+$, $Cs^+$, $Tl^+$, $Au^+$, $Ag^+$, $Cu^+$, $Mg^{+2}$, $Ca^{+2}$, $Sr^{+2}$, $Ba^{+2}$, $Zn^{+2}$, $Cd^{+2}$, $Pb^{+2}$, $La^{+3}$, and $Sn^{+4}$.

The modifying oxide or cations thereof to be extracted from the glass is not necessarily limited to one kind and, furthermore, may include all or a part of all of the modifying oxides within the glass. For example, in the case where $CaO$, $Na_2O$, $K_2O$, and $Cs_2O$ are contained as modifying oxides within a silicate glass, the modifying oxides which are extracted from the glass at relatively low temperatures are principally $Na_2O$ and $K_2O$. At high temperatures, $Cs_2O$ and $CaO$ also become extracted in some cases.

In the practice of the present invention, a glass containing modifying oxides is maintained at a temperature at which ions, atoms, or molecules (hereinafter referred to as "ions, etc.") of the modifying oxides can diffuse within the glass, and the glass outer surface is caused to contact an agent as described above. Ions, etc., which reach the glass outer surface because of the diffusion in the glass interior thereupon react with the agent and move out of the glass structure, whereby modifying oxides are extracted. In some cases, only cations constituting modifying oxides undergo substitution with hydrogen ions existing outside of the glass, and in some other cases both of these processes occur simultaneously.

Since ions, etc., of the modifying oxides in the glass interior are continually reaching the glass outer surface, the concentration within the glass of the modifying oxides or cations thereof can be caused, by maintaining the contact of the glass and agent for a specific time, to assume a distribution wherein the concentration increases progressively from the contact surface toward the interior of the glass.

In the case where the reaction velocity of the agent and the ions, etc., at the glass contact surface is excessively low relative to the diffusion velocity of the ions, etc., of the modifying oxides in the glass interior, almost no concentration gradient of the modifying oxides or cations thereof is produced in the glass interior. Consequently, the desired refractive index gradient cannot be obtained.

In order to obtain the desired refractive index gradient, it is necessary to use an agent as described before and to select an appropriate glass composition and contact temperature. The contact temperature must be in a range wherein the ions, etc., of the modifying oxides can diffuse within the glass and, moreover, must be selected from a temperature range wherein the deformation of the glass is not excessive. Ordinarily, this contact temperature is held below the softening temperature of the glass.

Furthermore, in the case where the velocity of the reaction of the agent and the ions, etc., at the glass contact surface is extremely higher than the diffusion velocity of the ions, etc., of the modifying oxides in the glass interior, the gradient of the modifying oxide concentration readily exhibits abrupt variations of stepwise form in the glass interior. In such a case, it is possible to establish the desired concentration gradient and refractive index distribution by heating only the glass after the contact process thereby to cause diffusion of the ions, etc., of the modifying oxides in the glass interior.

The distribution of concentration of modifying oxides or cations thereof in the interior of a fiber or filament of circular cross section in the case where the present invention is applied to the fiber and the resulting glass refractive index distribution will now be considered in a simplified manner on the basis of the principle involved.

Figures 3, 4, 5, 6, 7:
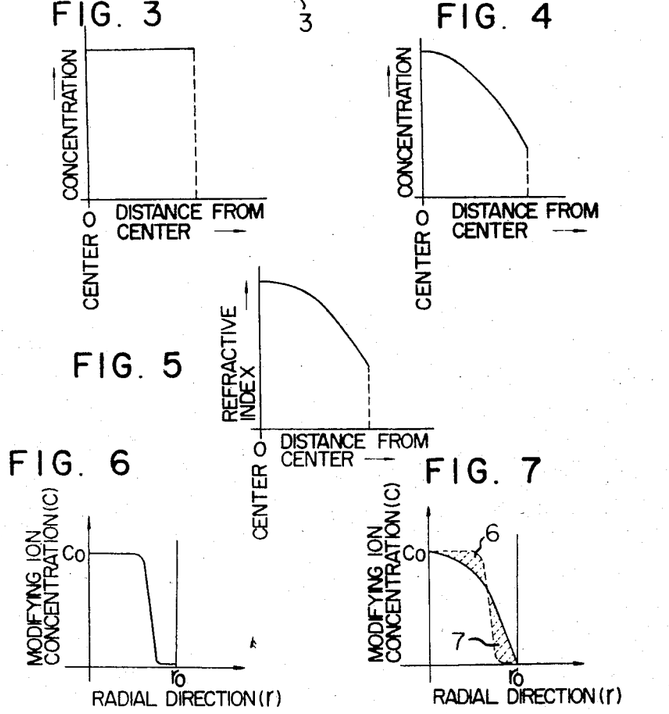
FIG. 3 is a graphical representation indicating the distribution of concentration of a modifying oxide or cations thereof within a glass fiber before being treated in accordance with the invention.
FIG. 4 is a similar graphical representation indicating another concentration distribution within a glass fiber according to the invention.
FIG. 5 is a graphical representation indicating the internal refractive index distribution of a glass fiber having a concentration distribution as indicated in FIG. 4.
FIGS. 6 and 7 are graphical representations indicating distributions of modifying ions in respective process steps of the invention.

The concentration distributions of modifying oxides or cations thereof occurring during process stages in the method of the invention are indicated in a simplified manner in FIGS. 3 and 4, in which the ordinate represents concentration of the glass-modifying ions, and the abscissa represents distance in the radial direction from the axial centerline of the fiber. FIG. 3 indicates the concentration within the glass fiber prior to contacting the agent, which concentration is constant in the radial direction. FIG. 4 indicates the concentration after contacting and heating of the glass fiber and the agent thereby to cause diffusion of the ions and reaction thereof with the agent at the contact surface, whereby a portion thereof is removed from within the glass to the outside.

The refractive index distribution from the glass fiber centerline toward the surface resulting from the above described process is indicated in FIG. 5, in which the ordinate represents refractive index, and the abscissa represents distance in the radial direction from the centerline. As indicated by the curve in FIG. 5, the refractive index decreases substantially in proportion to the square of the distance from the centerline.

The distribution of the modifying-ion concentration within a glass fiber after the fiber has been steeped in an aqueous solution at a high temperature to cause elution of the modifying ions in the surface layer is indicated in FIG. 6. When this glass is maintained for a long time at a temperature above the strain point and below the softening temperature of the glass fiber to cause the modifying ions of the shaded region 6 to undergo thermal diffusion to the shaded region 7 indicated in FIG. 7, the resulting curve of concentration distribution of the ions is substantially parabolic as indicated in FIG. 7.

The refractive index distribution in the interior of a light-conducting glass structure produced in accordance with the present invention is determined by the following conditions. First, the refractive index distribution in a glass structure which has been subjected to an extraction treatment is determined by the composition, dimensions, and shape of the glass, the composition of the agent used, the treatment temperature and time, and other factors.

In addition, it is possible by subjecting a glass structure thus treated to a subsequent deforming process such as heating and elongation and eroding, as necessary, to produce a light-conducting glass structure having the desired dimensions and refractive index distribution. Furthermore, the glass structure to be treated may have any shape. Ordinarily, the most common structures are rod-like or fiber-form structures of circular or polygonal cross sections, plate structures, and tubular structures. In addition to silicate glasses, borate glasses, phosphate glasses, and other oxide glasses can be used.

The concentration of the remaining modifying oxides or cations thereof within a glass from which such oxides or cations have been extracted is determined substantially by the distance from the glass surface of contact with the agent. Accordingly, in the particular case of a fiber-form or rod-like glass structure with a circular cross section, the refractive index in the interior of the structure after treatment assumes a radially symmetrical configuration determined by the distance from the central part of the fiber in a cross section thereof, which is a desirable result.

Furthermore, by carefully and appropriately selecting treatment conditions such as the compositions of the glass and the agent and the treatment temperature and time, it is possible to produce a light-conducting glass structure of fiber form or rod shape having a desired refractive index distribution wherein the index decreases substantially in proportion to the square of the distance from the centerline.

Figure 17:
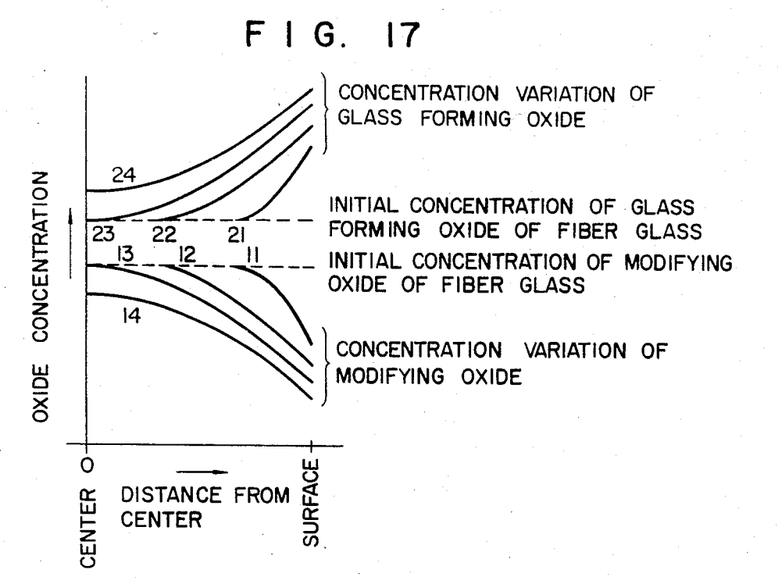
FIGS. 17 and 18 are graphical representations respectively indicating distributions of oxides and the internal refractive index distribution within a glass fiber.
Figure 18:
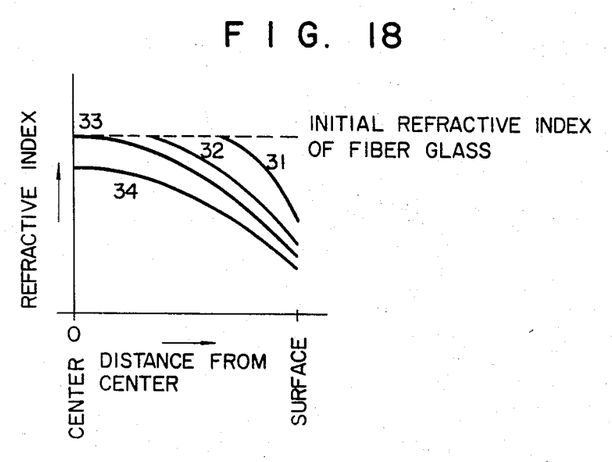

FIGS. 17 and 18 show how the oxide concentration distribution and the refractive index distribution will vary with duration of the contact of the glass with the agent. Thus, as the contact time is increased, concentration distributions of the modifying oxide, of glass forming oxide, and refractive index distribution within the glass are varied as shown by groups of curves (11, 21, 31), (12, 22, 32), (13, 23, 33), and (14, 24, 34) in FIGS. 17 and 18. When the contact time is relatively short, only at the surface will the concentration distribution of modifying oxide and of glass forming oxide and resultant refractive index gradient take place as shown by the curves 11, 21, 31, respectively, in FIGS. 17 and 18, and at deeper places within the glass the concentration and the refractive index will be maintained substantially constant at levels which are substantially the same as the initial ones. Excessively short duration of time of the contact cannot extract the modifying oxide out of the glass body in an amount sufficient to produce the desired refractive index distribution. When the contact time is relatively long, the concentrations of the modifying oxide and of the forming oxide are decreased and increased, respectively, from the initial concentrations thereby producing smaller refractive index at the center than the initial refractive index of the glass. Excessively long duration of time of the contact is not preferable in that almost all of the modifying oxide within the glass body is extracted out whereby no concentration distributions of the modifying oxide and of the forming oxide are established within the glass body sufficient enough to produce the desired refractive index gradient. Thus, the duration of time of the contact of the glass with the agent should be so selected that it is sufficient enough to effect the migration of the modifying oxide within the glass body such that the modifying oxide within the glass body near the surface is extracted out of the glass body through the outer surface by the agent and the modifying oxide at a places distant from the surface remains unextracted.

When a glass body having a substantially circular cross section is selected as the glass body and a contact time is so selected that the concentration of the modifying oxide will be substantially the same as the initial concentration of the body at a center of the body but be slightly lower than the initial concentration at places slightly distant from the center or that the concentration of the modifying oxide will be slightly lower than the initial concentration at the center, such concentration distribution of modifying oxide is obtained that the concentration continuously decreases from the center toward an outer surface of the glass body substantially in proportion to the square of the radial distance from the center toward the surface and thus the concentration of the glass forming oxide continuously increases from the center toward the surface substantially in proportion to the square of the radial distance. Since refractive index of glass varies substantially in proportion to the variation in oxides within the glass, the glass having the controlled distribution of modifying oxide as hereinabove described has a preferable refractive index distribution such that the refractive index continuously decreases, in a cross-section perpendicular to the center axis of the glass body, substantially in proportion to the square of the radial distance from the center toward the outer surface of the body as shown in FIGS. 17 and 18 by curves 13 or 14, 23 or 24, and 33 or 34.

In addition, by causing the two major outer surfaces of a glass plate or glass tubular structure to contact the agent, it is possible to cause the refractive index in the glass interior to assume a distribution wherein the index decreases substantially in proportion to the square of the distance from the approximate central plane or region intermediate between and equidistant from the two major outer surfaces.

When an incident light beam is introduced into this glass structure along the central plane or region thereof, the light beam advances through the glass structure in an undulating path passing alternatively into the two apposite sides of the central plane or region. This glass structure can be used as a lenticular lens and as other light-conducting glass devices.

A light-conducting glass fiber according to the invention can be coated over its outer surface with a material of low refractive index, a light-absorbent material, or a light-refractive material as necessary. It is also possible to combine such fibers to form a fiber bundle or fiber plate. Furthermore, a light-conducting structure produced in accordance with the invention can be utilized for various uses such as applications as conduction lines or paths for laser communication, optical image conductors, lenses, and lenticular lenses.

The term "fiber" is herein used to designate a structure having a length and cross sections which are transverse thereto and have maximum dimensions relatively smaller than the length, irrespective of the shape of the cross sections.

In order to indicate still more fully the nature and utility of the invention, the following examples of practice constituting preferred embodiments of the invention including results are set forth, it being understood that these examples are presented as illustrative only and are not intended to limit the scope of the invention. Throughout these examples, all percentages are by weight.

Example 1

A 0.1 mm diameter glass fiber composed of 50 percent of $Tl_2O$ and 50 percent of $SiO_2$ and having a strain point higher than 250°C but lower than 460°C, a softening point higher than 570°C and refractive index of 1.59 was steeped for 8 hours in a 1-normal aqueous solution of hydrochloric acid at a temperature controlled at 90 ± 5°C. The glass fiber was then taken out of the acid solution, cooled, washed with water, and dried. The glass fiber thus produced had $Tl_2O$ component near the outer surface extracted out, $Tl_2O$ component near the centerline remaining unextracted. The glass fiber was thereafter suspended and maintained for 20 minutes in an atmosphere at 560°C and then for 9 hours in an atmosphere at 470°C.

The glass fiber thus treated was found to have a refractive index of 1.59 at its centerline region and of 1.50 at its outer surface region. It was found that the glass fiber had $Tl_2O$ concentration such that it was low at the outer surface and it continuously increased from the surface toward the centerline where it was substantially the same as the initial $Tl_2O$ concentration (50%), and that the glass fiber had $SiO_2$ concentration such that it was high at the outer surface and it continuously decreased from the outer surface to the centerline where it was substantially the same as the initial concentration (50%). It was also found that this glass fiber had a refractive index distribution in cross sections perpendicular to the direction of advance of light therethrough wherein the refractive index decreases substantially parabolically from the center toward the fiber outer surface.

A part of this glass fiber of a length of approximately 10 cm was deflected into a curved shape of a radius of curvature of 1 cm. When an incident light beam of a width of approximately 0.01 mm was introduced into this deflected glass fiber at the center of one end face thereof, the light beam advanced through the interior of the glass fiber in an undulating path and, moreover, without being reflected at the fiber surface until it reached the other end of the glass fiber. The width of the light beam thus reaching the other end of the glass fiber was found to be substantially equal to the width of the light beam at the time of its entrance into the glass fiber.

Example 2

A 0.1 mm diameter glass fiber composed of 55 percent of PbO and 45 percent of $SiO_2$ and having a strain point higher than 300°C but lower than 470°C, a softening point higher than 580°C and refractive index of 1.63 was steeped for 16 hours in a 1-normal aqueous solution of hydrochloric acid at a temperature controlled at 90 ± 5°C. The glass fiber was then taken out of the acid solution, cooled, water washed, and dried. The glass fiber thus produced had PbO component, a modifying oxide, near the outer surface extracted out, $PbO_2$ component near the centerline remaining unextracted. Thereafter, the glass fiber was suspended and maintained for 20 minutes in an atmosphere at 570°C and then for 15 hours in an atmosphere at 480°C.

As a result, the glass fiber thus treated was found to have a refractive index of 1.63 at its centerline part and of 1.51 in its outer surface part. It was found that the glass fiber had PbO concentration such that it was low at the outer surface and it continuously increased from the periphery surface toward the centerline where it was substantially the same as the initial PbO concentration (55%), and that the glass fiber had $SiO_2$ concentration such that it is high at the outer surface and it continuously increased from the outer surface toward the centerline where it was substantially the same as the initial $SiO_2$ concentration (45%). It was found further that the refractive index distribution within this glass fiber was such that the index in cross sections perpendicular to the direction of advance of light through the fiber decreased substantially parabolically from the center toward the outer surface of the glass fiber.

A part of this glass fiber of a length of approximately 10 cm was deflected into a curved shape of a radius of curvature of 1 cm. When an incident light beam of a width of approximately 0.01 mm was introduced into this deflected glass fiber at the center of one end face thereof, the light beam advanced through the interior of the glass fiber in an undulating path, and moreover, without being reflected at the fiber surface until it reached the other end of the glass fiber. The width of the light beam thus reaching this other end of the fiber was found to be substantially equal to that of the original incident light beam.

Example 3

A glass fiber of 0.3 mm diameter composed of 13 percent of $Na_2O$, 22 percent of $Al_2O_3$, and 65 percent of $SiO_2$ and having a strain point lower than 500°C, a softening point higher than 650°C and refractive index of 1.494 was formed and maintained for 20 hours in a stream of $SO_3$ gas at a temperature of 600°C and thereafter cooled slowly to room temperature.

The $SO_3$ gas for this process can be prepared by mixing $SO_2$ gas and oxygen (air) and, preferably, passing the resulting gas mixture through a platinum catalyst. Furthermore, it is also possible to cause the $SO_3$ gas to contain water vapor beforehand.

After being thus slowly cooled, the glass fiber was steeped in warm water to remove the thin film of $Na_2SO_4$ which was adhering to the fiber surface.

The glass fiber thus treated was found to have a refractive index of 1.489 at the outer surface thereof and of 1.494 at the center thereof. The glass fiber thus produced had $Na_2O$ concentration component, a modifying oxide, near the outer surface extracted out, $Na_2O$ component near the centerline remaining unextracted. It was varified by means of an electron microprobe X-ray analyzer that the concentration of $Na_2O$ in the fiber interior exhibited a distribution wherein the concentration decreased progressively from the center toward the peripheral surface of the fiber. It was found that the glass fiber had $Na_2O$ concentration such that it was low at the outer surface and it continuously increased from the outer surface toward the centerline where it was substantially the same as the initial $Na_2O$ concentration (13%), and that the glass fiber had $SiO_2$ and $Al_2O_3$ concentrations such that they were high at the outer surface and they continuously decreased from the outer surface toward the centerline where they were substantially the same as the initial $SiO_2$ and $Al_2O_3$ concentrations (65% and 22%, respectively). It was found further that the refractive index distribution in the fiber interior was such that the index decreased substantially in proportion to the square of the distance outward from the fiber centerline.

A part of this glass fiber of approximately 30 cm length was deflected into a curved shape of a redius of curvature of 80 cm. When a mode-matched laser light beam was introduced as incident light into one end of this glass fiber thus deflected, the light beam advanced through the fiber interior in an undulating path and without being reflected at the fiber surface and exited from the other end of the fiber without phase velocity lag and with a width substantially equal to the original width of the incident light.

Example 4

A glass fiber of 0.5 mm diameter composed of 44 percent of $Tl_2O$ and 56 percent of $SiO_2$ and having a strain point higher than 240°C but lower than 450°C, a softening point higher than 560°C and refractive index of 1.602 was coated over its peripheral surface with a paste prepared by mixing chromium oxide and water, and the resulting coating was dried for approximately 1 hour at room temperature. The glass fiber thus dried was then maintained for a long time in an electric furnace at temperature controlled at 370 ± 5°C. The glass fiber was thereafter cooled at a cooling rate of 4°C/min to room temperature, washed with water to remove the paste on its surface, and then dried. The glass fiber thus produced had $Tl_2O$ component near the outer surface extracted out, $Tl_2O$ near the centerline remaining unextracted.

As a result of the above described treatment the concentration of $Tl_2O$ in the interior of the glass fiber exhibited a distribution wherein the concentration decreased progressively from the fiber center toward the periphery. It was found that the glass fiber had $Tl_2O$ concentration such that it was low at the outer surface and it continuously increased from the outer surface toward the centerline where it was substantially the same as the initial $Tl_2O$ concentration (44%), and that the glass fiber had $SiO_2$ concentration such that it was high at the outer surface and it continuously decreased from the outer surface toward the centerline where it was substantially the same as the initial $SiO_2$ concentration (56%). The refractive index of this glass fiber was found to be 1.602 at its centerline and 1.574 at the outer peripheral surface, exhibiting a substantially parabolic distribution thereof wherein the index decreased from the center toward the outer surface.

This glass fiber was cut to a certain length and both ends were ground perpendicularly to the fiber centerline, whereupon it was found that this glass fiber structure was capable of performing excellently as a lens.

Example 5

A 0.1 mm diameter glass fiber composed of 44 percent of $Tl_2O$ and 56 percent of $SiO_2$ and having a softening point higher than 240°C but lower than 450°C, a softening point higher than 560°C and refractive index of 1.602 was coated with a layer of approximately 0.5 mm thickness of a paste prepared by adding water to kaolin. This layer was then dried by leaving the glass fiber thus coated for approximately 1 hour at room temperature and then maintained for 10 hours in an electric furnace at a temperature controlled at 150 ± 5°C. Therefore, the glass fiber was cooled, washed with water to remove the coating layer, and dried.

As a result, the refractive index of the glass fiber thus treated was found to be 1.593 at the outer surface thereof and 1.602 at the centerline thereof and exhibited a distribution in cross sections perpendicular to the fiber centerline wherein the refractive index decreased progressively from the center toward the outer periphery. The glass fiber had $Tl_2O$ component near the outer extracted out, $Tl_2O$ near the centerline remaining unextracted.

As a result of measurement, the concentration of $Tl^+$ ions in the interior of this glass fiber was found to decrease progressively from the fiber center toward the peripheral surface, while the concentration of $H^+$ ions was found to increase progressively from the fiber center toward the peripheral surface. It was found that the glass fiber had $Tl_2O$ concentration such that it was low at the outer surface and it continuously increased from the outer surface toward the centerline where it was substantially the same as the initial $Tl_2O$ concentration (44%), and that the glass fiber had $H_2O$ concentration such that it was high at the outer surface and it continuously decreased from the outer surface toward the centerline where it was substantially the same as the initial $H_2O$ concentration (0%).

Example 6

Two glass fibers, each of 0.3 mm diameter, the first fiber composed of 50 percent of $Rb_2O$ and 50 percent of $SiO_2$ and having a strain point higher than 250°C but lower than 340°C, a softening point higher than 360°C and refractive index of 1.495 and the second fiber composed of 50 percent of $Cs_2O$ and 50 percent of $SiO_2$ and having a strain point higher than 250°C but lower than 340°C, a softening point higher than 360°C and refractive, index of 1.496 were coated over the outer surfaces thereof with a slurry prepared by mixing zirconia and metakaolin in the ratio of 5 to 1 and adding water to the resulting mixture. The slurry coating thus applied was then dried.

Thereafter, each fiber thus coated was maintained for 17 hours in a electric furnace at a temperature controlled at 200 ± 5°C, then taken out of the furnace, and cooled. Each fiber was then washed with water to remove therefrom solids applied as a coating in the above described manner. The glass fiber thus produced had $PbO_2$ or $Cs_2O$ component near the outer surface extracted out, $Rb_2O$ or $Cs_2O$ component near the centerline remaining unextracted. After this fiber was kept in the electric furnace, the furnace interior temperature was raised from room temperature to 350°C at a heating rate of 10°C/min, and the fiber was kept in the furnace for 8 hours as the furnace temperature was controlled at 350 ± 5°C. Thereafter, each glass fiber was cooled within the furnace to room temperature at a rate of 4°C/min and then taken out of the furnace.

As a result, the first fiber was found to have refractive indexed of 1.487 and 1.495 at the outer surface and centerline thereof, while the corresponding refractive indexes of the second fiber were found to be 1.486 and 1.496, the refractive index in each fiber decreasing substantially parabolically from the fiber centerline to the outer surface. It was found that the glass fiber had Rb₂O or Cs₂O concentration such that it was low at the outer surface and it continuously increased from the outer surface toward the centerline where it was substantially the same as the initial Rb₂O or Cs₂O concentration (50%), and that the glass fiber had SiO₂ concentration such that it was high at the outer surface and it continuously decreased from the outer surface toward the centerline where it was substantially the same as the initial SiO₂ concentration (50%).

Example 7

A 0.5 mm diameter glass fiber composed of 20 percent of Tl₂O, 12 percent of Na₂O, 20 percent of PbO, and 48 percent of SiO₂ and having a strain point of approximately 380°C, a softening point of approx. 550°C and refractive index of 1.608 was coated over its outer surface with a paste prepared by mixing chromium oxide and kaolin in a weight ratio of 5 to 1 and adding water to the resulting mixture. The coating thus applied was dried at room temperature, after which the fiber was maintained for 24 hours in an electric furnace at 450°C. Thereafter, the power supply to the furnace was shut off, and the fiber specimen was cooled within the furnace at a cooling rate of approximately 4°C/min to room temperature. The fiber was then taken out of the furnace, washed with water to remove the above mentioned paste, and dried. The glass fiber thus produced had Tl₂O and Na₂O components near the periphery surface extracted out, Tl₂O and Na₂O near the centerline remaining unextracted.

As a result of this treatment, the fiber was found to have a refractive index of 1.604 and at its centerline an of 1.587 at the outer surface, the refractive index decreasing progressively in accordance with a substantially parabolic curve from the center toward the outer surface in a cross section perpendicular to the direction of advance of light through the fiber.

It was found that the glass fiber had Tl₂O and Na₂O concentrations such that they were low at the outer surface and they continuously increased from the outer surface toward the centerline where they were substantially the same as the initial Tl₂O and Na₂O concentrations (20% and 12%, respectively), and that the glass fiber had PbO₂ and SiO₂ concentrations such that they were high at the outer surface and they continuously decreased from the outer surface toward the centerline where they were substantially the same as the initial PbO₂ and SiO₂ concentrations (20% and 48%, respectively). Further, it was found that the composition of glass near the outer surface was: Tl₂O 15.0%; Na₂O 10.5%, PbO 21.8%, and SiO₂ 52.7%; and the composition of glass near the centerline was substantially the same as the initial one and was: Tl₂O 19.4%, Na₂O 11.4%, PbO 20.2%, and SiO₂ 49.0%, and that the refractive index distribution was shown by the equation hereinbefore stated where the constant C was approximately 0.17 mm⁻².

A part of a piece of this glass fiber of a length of approximately 25 mm was deflected into a curved shape of a radius of curvature of 10 cm. An incident light beam of a constant width was mode matched along one end of this glass fiber and introduced into the central part of the one end of the fiber, whereupon the light beam was conducted through the glass fiber interior in an undulating path, without being reflected at the fiber outer surface, until it reached the other end of the fiber. The width of the light beam reaching this other end was found to be substantially equal to the width of the incident light beam.

Example 8

A glass fiber of the same composition and diameter as that specified in Example 7 was steeped for a specific time in a liquid mixture of 100 volumetric parts of carbon tetrachloride, 1 volumetric part of anhydrous silicon tetrachloride, and 5 volumetric parts of acetone, and then the white product formed on the fiber surface was removed. The glass fiber thus produced had Tl₂O and Na₂O near the periphery surface extracted out, Tl₂O and Na₂O near the centerline remaining unextracted. The glass fiber thus treated was maintained for a specific time at a temperature of 450°C.

As a result, the fiber thus produced was found to have a refractive index distribution therewithin wherein the index decreased substantially parabolically from the centerline toward the outer surface of the fiber. It was found that the glass fiber had Tl₂O and Na₂O concentrations such that they were low at the outer surface and they continuously increased from the outer surface toward the outer surface toward the centerline where they were substantially the same as the initial Tl₂O and Na₂O concentrations (20% and 12%, respectively), and that the glass fiber had PbO and SiO₂ concentrations such that they were high at the outer surface and they continuously decreased from the outer surface toward the centerline where they were substantially the same as the initial PbO and SiO₂ concentrations (20% and 48%, respectively).

Example 9

A glass fiber of a diameter of 0.5 mm composed of 80 percent of B₂O₃ and 20 percent of Tl₂O and having a strain point lower than 340°C, a softening point higher than 360°C and refractive index of 1.41 was coated over its outer surface with a paste prepared by admixing water with metakaolin. After this paste was dried, the fiber thus coated was maintained for 20 hours in an electric furnace at temperature controlled at 350 ± 5°C and thereafter was cooled to room temperature at a cooling rate of 4°C/min. The glass fiber was then washed with water to remove the paste and was then dried. The glass fiber thus produced had Tl₂O component near the surface extracted out, Tl₂O near the centerline remaining unextracted.

The glass fiber resulting from the above described treatment was found to have a refractive index of 1.41 at its centerline and of 1.38 at the outer surface, the refractive index decreasing substantially parabolically from the centerline toward the outer surface of the fiber. It was found that the glass fiber had Tl₂O concentration such that it was low at the outer surface and it continuously increased from the outer surface toward the centerline where it was substantially the same as the initial Tl₂O concentration (20%), and that the glass fiber had B₂O₃ concentration such that it was high at the outer surface and it continuously decreased from the outer surface toward the centerline where it was substantially the same as the initial B₂O₃ concentration (80%).

Example 10

Several pieces of a glass fiber, each of a diameter of 0.5 mm and a length of 1 meter composed of 20 percent of Tl₂O, 12 percent of Na₂O, 20 percent of PbO, and 48 percent of SiO₂ and having a strain point of approx. 380°C, a softening point of approx. 550°C and refractive index of 1.608 were held in mutually spacedapart arrangement in a vertical stainless-steel vessel having a gas outlet end and an end for charging chemicals thereinto. The vessel was heated in a vertical electric furnace to raise the temperature of the fibers gradially to 450°C.

At the instant when the temperature of the fibers reached 450°C, $NH_4Cl$ powder in a quantity of 10 mg per fiber was introduced into the stainless-steel vessel through its bottom, and the furnace temperature was maintained at 450 ± 5°C for 60 minutes. This treatment was carried out repetitively 8 times, after which the charging of $NH_4Cl$ was stopped, and the furnace temperature was lowered at a cooling rate of 4°C to room temperature. The glass fiber thus produced had $Tl_2O$ and $Na_2O$ near the surface extracted out, $Tl_2O$ and $Na_2O$ near the centerline remaining unextracted.

The fibers were then taken out of the vessel, washed with water to clean the surface, and dried. Thereafter, the fibers were again heated and maintained at 480°C for 6 hours, then cooled to room temperature, and taken out of the vessel.

As a result, the concentrations of $Tl_2O$ and $Na_2O$ in the interior of the glass fibers thus treated were found to decrease progressively and continuously from the center toward the outer surface of the fibers. The refractive index within each fiber and a distribution wherein the index decreased substantially in proportion to the square of the distance from the centerline. It was found that the glass fiber had $Tl_2O$ and $Na_2O$ concentrations such that they were low at the outer surface and they continuously increased from the outer surface toward the centerline where they are substantially the same as the initial $Tl_2O$ and $Na_2O$ concentrations (20% and 12%, respectively), and that the glass fiber had PbO and $SiO_2$ concentrations such that they were high at the outer surface and they continuously decreased from the outer surface toward the centerline where they were substantially the same as the initial PbO and $SiO_2$ concentrations (20% and 48%, respectively)

Example 11

A glass fiber of 0.5 mm diameter composed of 20 percent of $Tl_2O$, 12 percent of $Na_2O$, 20 percent of PbO, and 48 percent of $SiO_2$ and having a strain point of approx. 380°C, a softening point of approx. 550°C and refractive index of 1.608 was caused to contact saturated steam at 190°C for 20 hours in an autoclave and then taken out of the autoclave, and the white precipitate on the surface of the fiber was sashed off. The glass fiber thus produced had $Tl_2O$ and $Na_2O$ components near the surface extracted out, $Tl_2O$ and $Na_2O$ components near the centerline remaining unextracted. After drying, this fiber was maintained for 2 hours at 400°C in an electric furnace.

As a result, the refractive index within the glass fiber was found to decrease progressively and substantially parabolically from a value of 1.604 at the fiber centerline to a value of 1.596 at the fiber outer surface.

What is claimed is:

1. A method of producing a light-conducting glass structure having a progressively varying refractive index distribution comprising: preparing a fiber glass body having a central axis and a uniform refractive index distribution and containing at least one kind of glass-forming oxide selected from the group consisting of $SiO_2$, $B_2O_3$ and $P_2O_5$ and at least one kind of modifying oxide capable of migrating through the glass body, the concentration of said modifying oxide being uniform throughout the fiber glass; and contacting the glass body with an agent having sufficient affinity for said modifying oxide to extract said modifying oxide from said glass body through the contact surface existing between the glass body surface and the agent and maintaining said glass body in contact with said agent for a time duration sufficient to effect migration of said modifying oxide such that a greater amount of modifying oxide is extracted out of the surface region of said glass body through the contact surface than at places within the glass body distant from the surface region to thereby both progressively decrease the concentration of said glass-forming oxide and progressively increase the concentration of said modifying oxide from the contact surface toward said central axis to establish in the glass body a progressively varying refractive index distribution progressively increasing from the surface to said axis.

2. A method according to claim 1 wherein said contacting step is carried out at a temperature below the softening point of the glass body.

3. A method according to claim 1 wherein said contacting step is carried out at a temperature below the strain point of the glass body; and then heating the glass body to a temperature above said strain point to effect migration from the central part to the outer surface part of the glass body of the remaining said modifying oxide within the glass body which have not previously been extracted.

4. A method according to claim 1 wherein said agent comprises water.

5. A method according to claim 1 wherein said agent comprises an aqueous solution of a mineral acid.

6. A method according to claim 5 wherein said aqueous solution of a mineral acid comprises an aqueous solution of hydrochloric acid.

7. A method according to claim 4 wherein said water is in the form of water vapor.

8. A method according to claim 5 including, after contacting the glass body with said aqueous solution of a mineral acid, maintaining the glass body at a temperature sufficiently above the strain point thereof to effect migration of ions of said modifying oxide within the glass body which have not yet been extracted from the central part to the outer surface part of the glass body.

9. A method according to claim 1 wherein said agent comprises a hydrated silicate clay-like mineral.

10. A method according to claim 9 wherein said contacting step includes applying the hydrated silicate in paste form to said glass body.

11. A method according to claim 1 wherein said agent is selected from the group consisting of oxides of zirconium and oxides of chromium.

12. A method according to claim 1 wherein said agent comprises an acidic gas.

13. A method according to claim 12 wherein said acidic gas comprises $SO_3$ gas.

14. A method according to claim 1 wherein said agent comprises an inorganic chloride which decomposes at least partially at the temperature at which said contacting step is carried out.

15. A method according to claim 14 wherein said inorganic chloride comprises ammonium chloride.

16. A method according to claim 1 wherein said agent is selected from the group consisting of carbon tetrachloride, silicon tetrachloride, and a mixture of carbon tetrachloride and silicon tetrachloride.

17. A method according to claim 1 wherein said modifying oxides to be extracted are oxides selected from the group consisting of thallium oxide and alkali metal oxides.

18. A method according to claim 1 wherein said fiber glass body prepared has a circular cross-section perpendicular to said axis, and time duration of said contacting is sufficient to produce distribution of the concentration of said modifying oxide such that at the center region of the glass body the concentration of said modifying oxide is substantially the same as and at a place slightly distant from the center region is slightly lower than the initial concentration or that at the center region of the glass body the concentration of said modifying oxide is slightly lower than the initial concentration, whereby said progressively varying refractive index distribution is substantially represented by the equation $N = N_o(1 - Cr^2)$, wherein $r$ is the radial distance from the central axis of the glass body, $N_o$ is the refractive index of the glass body at said center axis, $N$ is the refractive index of the glass body at a radial distance $r$ from the central axis, and $C$ is a positive constant from $2 \times 10^{-4} \text{mm}^{-2}$ to $2 \times 10^2 \text{ mm}^{-2}$ when the distance $r$ is expressed in terms of mm (millimeter).

19. A light-conducting glass structure produced by the method recited in claim 1.

20. A method of producing a light-conducting glass structure for conducting light along the central axis thereof and having a refractive index distribution such that the refractive index is substantially represented by the equation $N = N_o(1 - Cr^2)$, wherein $r$ is the radial distance from the central axis of the structure, $N_o$ is the refractive index of the structure at said axis, $N$ is the refractive index of the structure at a radial distance $r$ from the axis, and $C$ is a positive constant comprising: preparing fiber glass body having a circular cross-section and having a uniform refractive index and containing at least one kind of oxide selected from the group consisting of $SiO_2$, $B_2O_3$ and $P_2O_5$, and at least one kind of modifying oxide selected from the group consisting of oxides of Li, Na, K, Rb, Cs, Tl, Au, Ag, Cu, Mg, Ca, Sr, Ba, Zn, Cd, Pb, La, and Sn, said modifying oxide having a uniform concentration distribution throughout said body; and contacting the glass body with at least one agent selected from the group consisting of acidic gas, acid halides, zirconium oxide, chromium oxide, carbon tetrachloride, anhydrous silicon tetrachloride, mineral acid, aluminum chloride, ammonium sulphate, ammonium chloride, calcium chloride, clay-like mineral, and water at a sufficient temperature and for a sufficient time duration to effect migration of said modifying oxide such that the modifying oxide near the surface in contact with the agent is extracted out of the glass body through the surface by said agent and said modifying oxide near the central axis remains unextracted thereby to effectively decrease the concentration of said oxide and increase the concentration of said modifying oxide continuously from the surface toward the central axis of the glass body to obtain a concentration distribution therein which progressively reduces the refractive index of the glass body in accordance with said refractive index distribution.

21. A method of producing a light-conducting fiber glass structure having a progressively varying refractive index distribution comprising: preparing a fiber glass body having a central axis, a peripheral surface surrounding the axis, and a uniform refractive index throughout the body and containing at least one kind of glass forming oxide and at least one kind of modifying oxide capable of migrating through the glass body, said glass forming oxide and said modifying oxide respectively having a uniform initial concentration distribution throughout the body, said modifying oxide being such that it would lower the refractive index of said body if the concentration of said modifying oxide within said body was lowered and the concentrations of components of the glass other than said modifying oxide were thus relatively increased; contacting all the area of the peripheral surface of the glass body with an agent having sufficient affinity for said modifying oxide to extract said modifying oxide from said glass body through the peripheral surface at a high temperature for a time duration, said temperature being such that said modifying oxide can migrate within the glass body thereat, said time duration being such that said modifying oxide near the surface within the body is extracted out of the body through the surface by said agent and said modifying oxide at a place distant from the surface remains unextracted thereby producing concentration gradients of said modifying oxide and of said glass forming oxide continuously decreasing and increasing, respectively, from the center toward the surface of the body wherein the concentration at the center of the body of said modifying oxide is the same as or lower than the initial concentration of said modifying oxide and the concentration at the center of the body of said glass forming oxide is the same as or higher than the initial concentration of said glass forming oxide, said concentration gradients of said modifying oxide and of said glass forming oxide establishing in the glass body a progressively varying refractive index distribution continuously decreasing from said central axis to the surface.

22. A method of producing a light-conducting fiber glass structure having a progressively varying refractive index distribution comprising: preparing a fiber glass body having a central axis, a peripheral surface surrounding the axis and a uniform refractive index distribution and containing at least one kind of glass forming oxide and at least one kind of modifying oxide capable of migrating through the glass body, said glass forming oxide and said glass modifying oxide respectively having uniform initial concentration distribution throughout the body, said modifying oxide being such that it would lower the refractive index of said glass body if the concentration of said modifying oxide within said body was lowered and the concentration of components of the glass other than said modifying oxide were thus relatively increased; contacting all the area of the peripheral surface of the glass body with an agent having sufficient affinity for said modifying oxide to extract said modifying oxide from said glass body through the peripheral surface for a time duration sufficient to effect migration of said modifying oxide such that the modifying oxide near the surface is extracted out of the glass body through the surface by said agent and the modifying oxide at places within the glass body distant from the surface remains unextracted; maintaining the glass body after the contact with said agent at a temperature at which said modifying oxide can migrate through the glass body for a time duration sufficient for said modifying oxide remaining unextracted at places within the glass body distant from the surface to migrate toward the surface thereby to produce distribution of the concentrations of said modifying oxide and said glass forming oxide such that the concentrations continuously decreases and increases, respectively, from the center of the body toward the surface wherein the concentration of said modifying oxide at the center of the body is the same as or lower than the initial concentration of said modifying oxide and the concentration of said glass forming oxide at the center of the body is the same as of higher than the initial concentration of said glass forming oxide, whereby the varying concentrations of said modifying oxide and said glass forming oxide establish in the glass body a progressively varying refractive index distribution continuously decreasing from said central axis toward the surface.

23. A method of producing a light-conducting glass structure having a continuously varying refractive index distribution comprising: preparing a glass body having a uniform refractive index distribution throughout the body and containing at least one kind of oxide selected from the group consisting of $SiO_2$, $B_2O_3$ and $P_2O_5$ and at least one kind of modifying oxide capable of migrating through the glass body, said oxide and said glass modifying oxide respectively having a uniform initial concentration distribution throughout the body, said modifying oxide being such that it would lower the refractive index of said glass body if the concentration of said modifying oxide within said body was lowered and the concentrations of components of the glass other than said modifying oxide were thus relatively increased; contacting the glass body with an agent having sufficient affinity for said modifying oxide to extract said modifying oxide from said glass body through the contact surface existing between at least a part of the glass body surface and the agent for a time duration sufficient to effect migration of said modifying oxide such that the modifying oxide near the surface is extracted out of the glass body through the contact surface by said agent and the modifying oxide at places within the glass body distant from the surface thereby to produce distribution of the concentrations of said modifying oxide and said oxide such that the concentrations continuously increases and decreases, respectively, from the contact surface toward the interior of the glass body wherein the concentration of said modifying oxide the places distant from the surface is the same as or lower than the initial concentration of said modifying oxide and the concentration of said oxide at the places distant from the surface is the same as or higher than the initial concentration of said oxide, whereby the varying concentrations of said modifying oxide and said oxide establish in the glass body a continuously varying refractive index distribution continuously increasing from said contact surface toward the interior of the glass.

* * * * *